US008060312B2

(12) United States Patent　(10) Patent No.: US 8,060,312 B2
Wang et al.　(45) Date of Patent: Nov. 15, 2011

(54) SYSTEM AND METHOD FOR MIGRATING SEISMIC DATA

(75) Inventors: Yue Wang, Danville, CA (US); Norman Ross Hill, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 905 days.

(21) Appl. No.: 12/079,170

(22) Filed: Mar. 24, 2008

(65) Prior Publication Data

US 2009/0240438 A1　Sep. 24, 2009

(51) Int. Cl.
*G01V 1/00*　(2006.01)
*G06F 19/00*　(2006.01)

(52) U.S. Cl. ............................................. 702/14
(58) Field of Classification Search .................. 702/14
See application file for complete search history.

(56) References Cited

U.S. PATENT DOCUMENTS

| | | | | |
|---|---|---|---|---|
| 4,766,574 A * | 8/1988 | Whitmore et al. | ............. | 367/50 |
| 5,198,979 A | 3/1993 | Moorhead et al. | | |
| 5,274,605 A * | 12/1993 | Hill | ............. | 367/53 |
| 5,734,829 A * | 3/1998 | Robinson | ............. | 709/205 |
| 7,859,942 B2 * | 12/2010 | Stork | ............. | 367/38 |
| 7,937,224 B2 * | 5/2011 | Peng | ............. | 702/17 |
| 2005/0143921 A1 | 6/2005 | Winbow et al. | | |
| 2006/0056272 A1 * | 3/2006 | Hill | ............. | 367/73 |
| 2007/0271041 A1 * | 11/2007 | Peng | ............. | 702/14 |
| 2011/0128817 A1 * | 6/2011 | Keers | ............. | 367/38 |

FOREIGN PATENT DOCUMENTS
WO　WO95/34037　12/1995

OTHER PUBLICATIONS

Sun Y et al: "3-D prestack Kirchhoff beam 1-15, migration for depth imaging", Geophysics, vol. 65, No. 5, Oct. 1, 2000, pp. 1592-1603.
Yerneni S et al: "Imaging subsurface geology with seismic migration on a computing cluster" Current Science, vol. 88, No. 3, Feb. 10, 2005, pp. 468-474.
Gray, S H et al: "Imaging using multi-arrivals: Gaussian beams or multi-arrival Kirchhoff" SEG 72ND Annual Meeting, Salt Lake City, Utah, Oct. 6-11, 2002, Nov. 6, 2002, pp. 1-4.
Alkahalifah et al., Velocity analysis for transversely isotropic media, Geophysics, vol. 60, pp. 1550-1566 (1995).
Bleistein, On the imaging of reflectors in the earth, Geophysics, vol. 52, pp. 931-942 (1987).
Cerveny et al., Computation of Wavefields in Inhomogeneous Media-Gaussian Beam Approach, Geophysical Journal of the Royal Society, vol. 70, 1982, pp. 109-128.
Cerveny, Seismic rays and ray intensities in inhomogeneous anisotropic media, Geophysical Journal, vol. 29, pp. 1-13 (1972).

(Continued)

*Primary Examiner* — Cindy Hien-Dieu Khuu
(74) *Attorney, Agent, or Firm* — Carlos L. Hanze

(57) ABSTRACT

A system and method that enable the processing of seismic data. In one embodiment, a system comprises a plurality of processing nodes and a server. The plurality of processing nodes are configured to process seismic data for migration. The server is operatively linked to each of the plurality of processing nodes to enable communication between the server and the processing nodes. The server may manage a set of stored beam tables that can be accessed by the processing nodes in order to process seismic data.

9 Claims, 9 Drawing Sheets

OTHER PUBLICATIONS

Da Costa et al., Gaussian Beam Migration, Expanded Abstracts for the 59$^{th}$ Annual Meeting of the Society of Exploration Geophysicists, Oct. 1989, pp. 1169-1171.

Dickens, Ray tracing in tilted transversely isotropic media: a group velocity approach, SEG Extended Abstracts, vol. 23, pp. 973-976 (2004).

Gajewski et al., Vertical seismic profile synthetics by dynamic ray tracing in laterally varying layered anisotropic structures, Journal of Geophysics Res., vol. 95, pp. 11301-11315, (1990).

Gray, S.H., Gaussian beam migration of common-shot records, Geophysics, vol. 70, No. 4 (Jul.-Aug. 2005), pp. S71-S77.

Hill, N.R., Gaussian beam migration, Geophysics, vol. 55, No. 11 (Nov. 1990): pp. 1416-1428.

Hill, N.R., Prestack Gaussian-beam depth migration, Geophysics vol. 66, No. 4, Jul.-Aug. 2001, pp. 1240-1250.

Iverson et al., Ray tracing for continuously rotated local coordinates belonging to a specified anisotropy, Stud. Geophys. Geod., vol. 51, pp. 59-88 (2007).

Kinneging et al., Efficient 2d and 3d Shot Record Redatuming, Geophysical Prospecting 37, 1989, pp. 493-530.

Lazaratos et al. Radon Transform/Gaussian Beam Migration, Expanded Abstracts for the 60$^{th}$ Annual Meeting of the Society of Exploration Geophysicists, Oct. 1990, pp. 1314-1317.

Mathematics of Modeling, Migration and Inversion with Gaussian Beams, http://www.cwp.mines.edu/~norm/shrtcrse/gbnotes.pdf (accessed 2007).

Thomsen, Weak elastic anisotropy, Geophysics, vol. 51, pp. 1954-1966 (1986).

Wapenaar et al., Inverse Extrapolation of Primary Seismic Waves, Geophysics, vol. 54, No. 7 (Jul. 1989), pp. 853-863.

Zhu et al., Prestack Gaussian-beam depth migration in anisotropic media, Geophysics, vol. 72, pp. S133-S138 (2007).

* cited by examiner

SYSTEM AND METHOD FOR MIGRATING SEISMIC DATA

FIELD OF THE INVENTION

The invention relates generally to systems and methods for migrating seismic data, and more particularly, to the depth migration of seismic data, such as seismic data gathered in the shot domain.

BACKGROUND OF THE INVENTION

Systems and methods for depth migrating seismic data are known. For example, conventional techniques include the implementation of Gaussian beams to model the propagation of seismic waves through a seismic volume of interest in a migration. Such migrations may be referred to as Gaussian beam migration. Conventional techniques that implement other techniques to model seismic wave propagation are also known (e.g., finite difference methods).

Migration techniques are formulated to be applied in different data domains, such as the common-offset domain, the common-shot domain, and/or other domains. Each domain typically has strengths and weaknesses with respect to computational efficiency, image quality, flexibility of application, support of velocity analysis, etc. For instance, common-shot domain migration tends to be more universally and directly applicable to seismic data because the data are recorded in the common-shot domain. However, migrating data in the common-shot domain may be relatively computationally intensive.

In Gaussian beam migration techniques, beam tables are determined by ray tracing through a provisional Earth model to describe one or more parameters of the Gaussian beams (or other type(s) of beams) being used to model the seismic waves. The beam tables are then used in the migration to determine an image of one or more reflectors within the seismic volume of interest. Conventional techniques for computing and using beam tables tend to be processing intensive.

SUMMARY

One aspect of the invention relates to a method of processing seismic data. In one embodiment, the method comprises receiving a request for a beam table that corresponds to a table location on a geographic surface from one of a plurality of processing nodes that are processing seismic data for migration, wherein a beam table is a record of one or more beam parameters of one or more beams that form seismic wavefronts arriving at or near the table location; determining whether the requested beam table is included in a set of stored beam tables, wherein the set of stored beam tables includes one or more beam tables stored externally from the processing node; and initiating transmission of the requested beam table to the processing node if the requested beam table is included in the set of stored beam tables.

Another aspect of the invention relates to a system configured to process seismic data. In one embodiment the system comprises a plurality of processing nodes and a server. The plurality of processing nodes are configured to process seismic data for migration. In some instances, each processing node comprises a migration module and a table module. The migration modules are configured to determine an image of the seismic volume beneath the geographic surface, wherein the determination is based at least in part on one or more beam tables, and wherein a beam table corresponds to an imaging location on a geographic surface of the seismic volume of interest and is a record of one or more beam parameters of one or more beams that form seismic wavefronts arriving at the imaging location. The table modules are configured to obtain beam tables for the migration modules. The server is operatively linked to each of the plurality of processing nodes to enable communication between the server and the processing nodes. In some instances, the server comprises a query module and a query results module. The query module is configured to receive a request from a table module of one of the processing nodes for a beam table corresponding to a table location on the geographic surface of the seismic volume of interest, and to determine whether the requested beam table is included within a set of stored beam tables, wherein the table location on the geographic surface is determined by the requesting table module based on the imaging location identified in a request for a beam table from the migration module associated with the requesting table module. The query results module is configured to initiate access of the requested beam table by the requesting table module if the requested beam table is included in the set of stored beam tables.

Another aspect of the invention relates to a method of migrating seismic data. In one embodiment, the method comprises (a) defining a series of primary locations within a seismic volume; (b) determining travel times of one or more beams that form seismic wavefronts that pass through one of the primary locations, wherein the travel times comprise travel times of one or more beams between a source of the seismic wavefronts and the primary location and travel times of one or more beams between the primary location and a set of detectors that detect the seismic wavefronts; (c) repeating (b) for each of the primary locations within the seismic volume; (d) determining gradients of the travel times of the beams between the source of the seismic wavefronts and the primary locations within the seismic volume based at least in part on the determined travel times of the beams between the source of the seismic wavefronts and the primary locations; (e) determining gradients of the travel times of the beams between the primary locations and the set of detectors based at least in part on the determined travel times of the beams between the primary locations and the set of detectors; and (f) determining one or more beam parameters of one or more beams through a location within the seismic volume that is not a primary location based at least in part on (i) the gradients of the travel times of the beams between the source of the seismic wavefronts and the primary locations, (ii) the gradients of the travel times of the beams between the primary locations and the set of detectors, and (iii) a spatial position of the location with respect to one of the primary locations.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
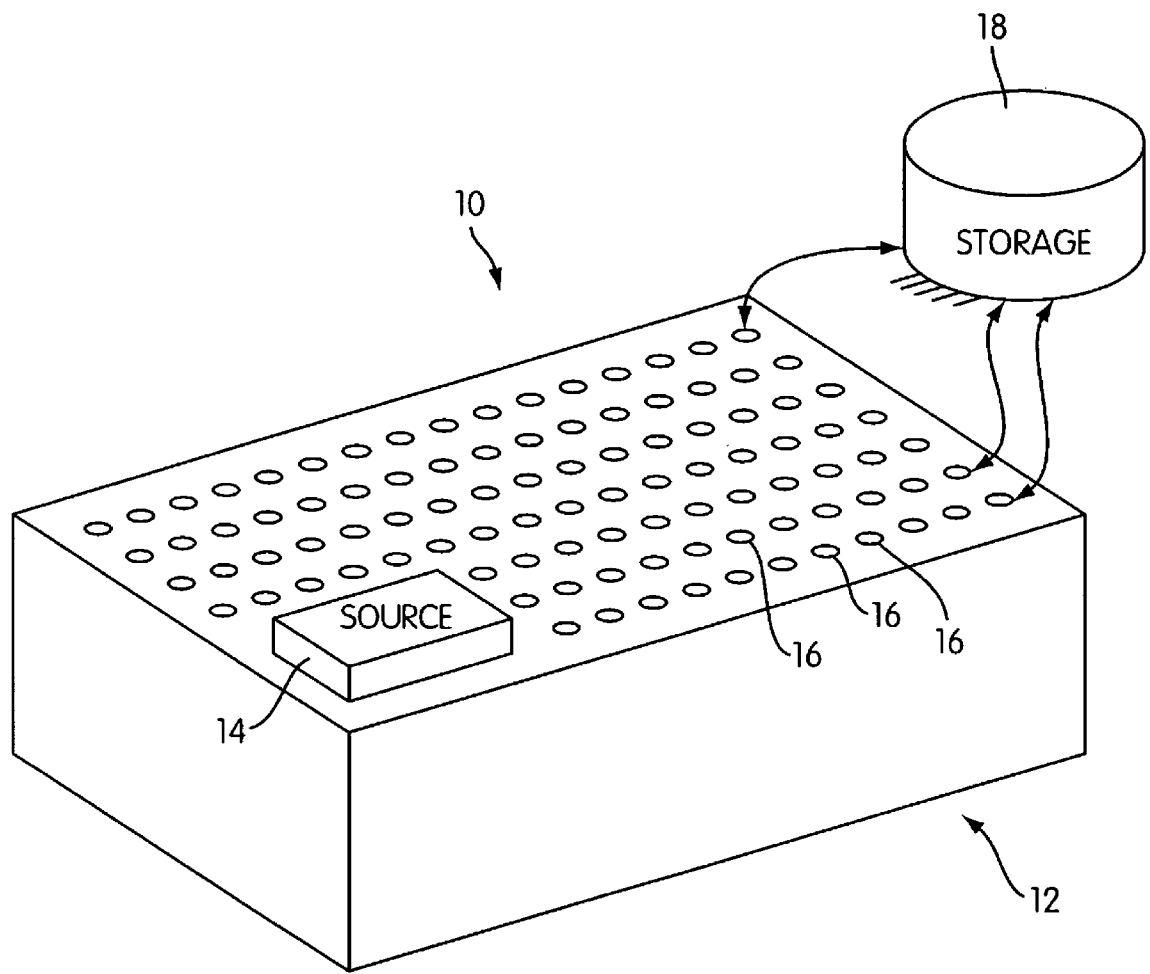
FIG. 1 illustrates a system configured to obtain seismic data related to a seismic volume of interest, according to one or more embodiments of the invention.

FIG. 1 illustrates a system 10 configured to obtain seismic data related to a seismic volume of interest 12. System 10 records information related to the rate of propagation and/or the reflection of seismic waves within seismic volume of interest 12. As is discussed below, from the information recorded by system 10, one or more images of geological features within the seismic volume of interest 12 are determined. In one embodiment, system 10 includes a source 14 and a set of detectors 16.

In one embodiment, source 14 generates waves within the seismic volume of interest 12. As such, source 14 is a source of seismic wavefronts that propagate through seismic volume of interest 12. Source 14 may generate seismic waves that enter the seismic volume of interest 12, and/or source 14 may physically impact the surface of seismic volume of interest 12 to generate the waves. For example, in one embodiment, source 14 includes marine air guns.

Detectors 16 are configured to detect seismic wavefronts. For example, detectors 16 may include seismometers that measure and record motion. In the embodiment illustrated in FIG. 1, detectors 16 are disposed on a surface of seismic volume of interest 12. However, this is not intended to be limiting, and in some embodiments, detectors 16 may include instruments that detect subsurface seismic wavefronts. Still further, in one embodiment, detectors 16 include instruments disposed on a surface of a body of water located on top of seismic volume of interest 12, and detect wavefronts that propagate up to detectors 16 from an interface between a surface of seismic volume of interest 12 and the water. Detectors 16 are typically disposed in a uniform and/or predetermined manner with respect to seismic volume of interest 12. For example, detectors 16 may be disposed along a grid at the surface of seismic volume of interest.

As can be seen in FIG. 1, in one embodiment, system 10 further comprises a seismic data storage module 18. Seismic data storage module 18 stores information (sometimes referred to as "seismic data") related to the generation of seismic waves by source 14 and/or the detection of waves by detectors 16. This information may include positional (and/or orientation) information related to one or both of source 14 and/or detectors 16, information related to the waves generated by source 14 (e.g., frequency, phase, amplitude, etc.), information related to the waves detected by individual ones of detectors 16, (e.g., frequency, phase, amplitude, etc.), and/or other information.

Seismic data storage module 18 stores the seismic data electronically. As such, seismic data storage module 18 may include one or more of optical storage media, magnetic storage media, solid state storage media, digital storage media, analog storage media, and/or other electronic storage media.

In the embodiment illustrated in FIG. 1, seismic data storage module 18 includes a single centralized storage facility that is operatively linked with detectors 16 and/or source 14. In this embodiment, the operative link between seismic data storage module 18, detectors 16, and/or source 14 may be accomplished via electronic communication (e.g., wired communication, wireless communication, communication via a network, etc.). In some instances, the operative link between seismic data storage module 18 and detectors 16 includes a set of removable electronic storage media that are disposed individually at each of detectors 16 (or are each linked to a set of detectors 16), and then are removed and transported to the centralized storage facility for storage and/or data transfer. It should be appreciated that the illustration of seismic data storage module 18 is not intended to be limiting. In one embodiment, seismic data storage module 18 may include a set of distributed storage facilities (e.g., disposed at individual detectors 16).

Figure 2:
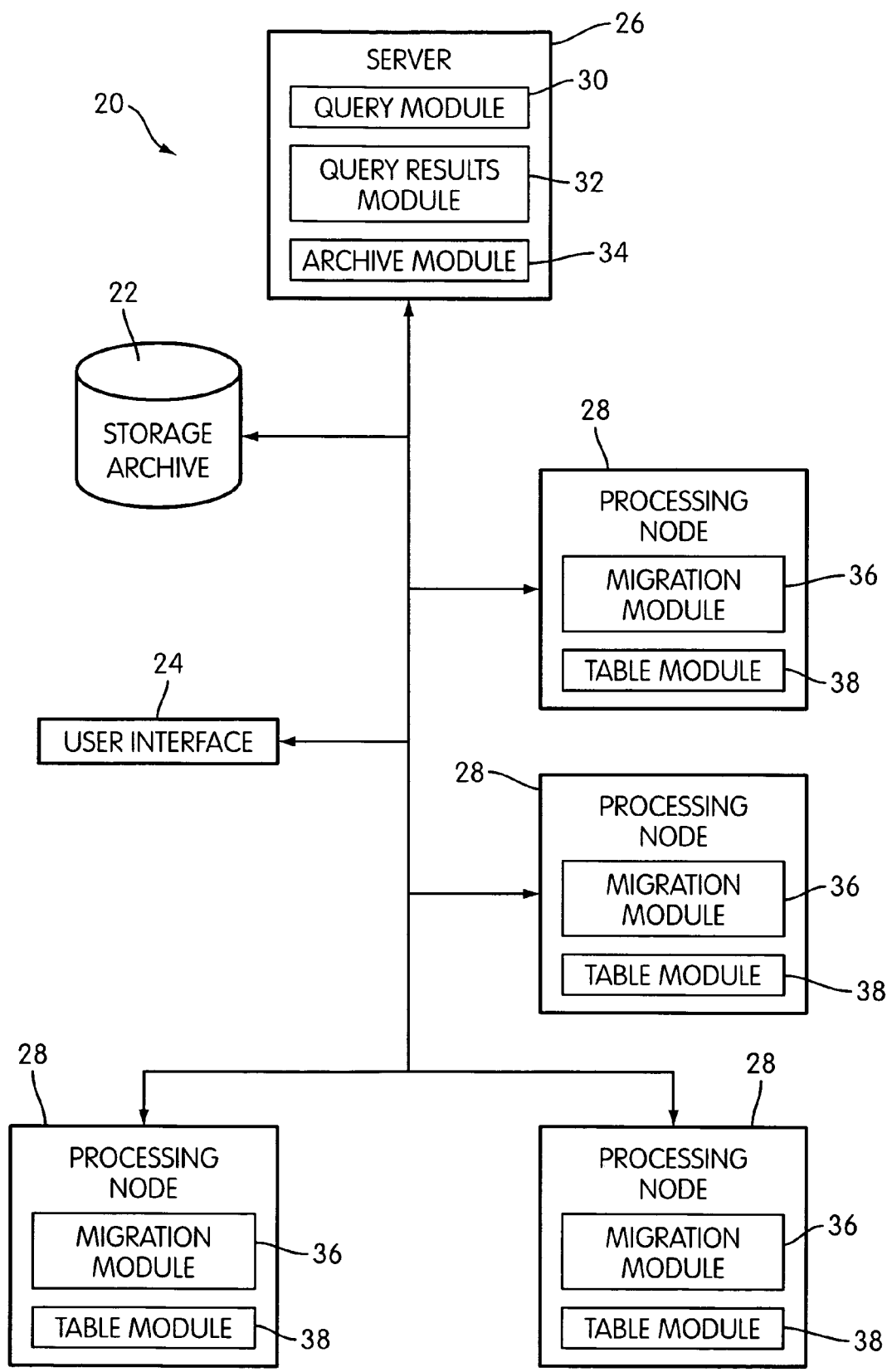
FIG. 2 illustrates a system configured to migrate seismic data to account for reflectors of seismic waves within a seismic volume of interest, in accordance with one or more embodiments of the invention.

FIG. 2 illustrates a system 20 configured to migrate seismic data to account for reflectors of seismic waves within a seismic volume of interest that are not always horizontal and planar. As should be appreciated, this migration will typically enable an image to be formed of the geological features of a seismic volume of interest (e.g., horizons, reflectors, etc.) from the migrated seismic data that is a more accurate depiction of the geological features present in the seismic volume of interest than an image formed from the non-migrated seismic data. The migration discussed below is a migration of "single-shot data." In other words, the migration is a migration of seismic data that is generated by a single "shot," or burst of seismic waves generated by a source of seismic waves. Single shot migrations, as opposed to, for example, common azimuth and/or common offset migrations, may be substantially universally applicable to seismic surveys because data are physically recorded from single shots. It should be appreciated that in some instances, a single "shot" may be emitted by an array of sources, and not a single source, as is illustrated in FIG. 1.

Returning to FIG. 2, in one embodiment, system 20 is configured to execute Gaussian beam migration of the seismic data. Some of the principles of Gaussian beam migration are described, for example, in U.S. Pat. No. 5,274,605 ("'605 Patent"), the contents of which are incorporated herein in their entirety. However, it should be appreciated that certain aspects of the following description of system 20 can be extended to migrations accomplished without using Gaussian beams as the basic function for decomposing the seismic waves depicted by the seismic data being migrated. In one embodiment, system 20 comprises a storage archive 22, a user interface 24, a server 26, and a plurality of processing nodes 28.

Storage archive 22 stores information that enables seismic data generated by system 10 (shown in FIG. 1 and described above) to be migrated, and used to form an image of a seismic volume of interest (e.g., seismic volume of interest 12). Such information includes a set of stored beam tables. As used herein, the term "beam table" refers to a record of one or more beam parameters of one or more beams that form the seismic wavefronts depicted in seismic data. In one embodiment, the beam parameters within a beam table may include one or more of a travel time, an amplitude, a phase, an angle of incidence, and/or other beam parameters. Generally, a beam table is a record of one or more beam parameters of one or more beams that form the seismic wavefronts that reach a specific location, referred to as a "table location," in the seismic volume of interest that corresponds to the beam table. In the embodiments discussed herein, table locations are located at or near the geographic surface of the seismic volume of interest, but this should not be viewed as limiting.

In order to provide storage for the stored set of beam tables, storage archive 22 includes one or more electronic storage media. For example, storage archive 22 may include one or more of optical storage media, magnetic storage media, solid state storage media, digital storage media, analog storage media, and/or other electronic storage media. Storage archive 22 is operatively linked with server 26, and each of processing nodes 28 for electronic communication therewith. The operative link(s) between storage archive 22, server 26, and/or processing nodes 28 can be accomplished via wired and/or wireless communication. In some instances, the link between storage archive 22 and processing nodes 28 may be accomplished through server 26. In one embodiment, communication between storage archive 22 and processing nodes 28 is managed, at least to some extent, by server 26 in the manner discussed below.

In one embodiment, storage archive 22 is a centralized archive located at a single physical location, as is shown in FIG. 2. In one embodiment, storage archive 22 has a distributed architecture. In this embodiment, storage archive 22 may still be located at a single physical location, or may be distributed physically between a plurality of locations. For example, storage archive 22 may include a set of storage modules, with individual ones of the modules being provided at individual ones of processing nodes 28.

User interface 24 is configured to provide an interface between system 20 and one or more users through which users may provide information to and receive information from system 20. This enables data, results, parameters, and/or instructions and/or any other communicable items, collectively referred to as "information," to be communicated between the users and one or more of storage archive 22, server 26, and/or processing nodes 28. For example, a user may initiate a migration of seismic data by providing, via user interface 24, one or more of the seismic data, information derived at least in part from the seismic data (e.g., a velocity model of the seismic volume of interest) and/or one or more parameters governing the migration (e.g., an initial beam direction, one or more initial beam properties, such as width, amplitude and/or characteristic frequency, a boundary condition, etc.), and/or other information to system 20. Examples of interface devices suitable for inclusion in user interface 24 include a keypad, buttons, switches, a keyboard, knobs, levers, a display screen, a touch screen, speakers, a microphone, an indicator light, an audible alarm, and a printer. In one embodiment, user interface 24 actually includes a plurality of separate interfaces, including separate interfaces provided at individual ones of processing nodes 28, and/or a separate interface provided to view and/or manage system 20 via server 26.

It is to be understood that other communication techniques, either hard-wired or wireless, are also contemplated by the present invention as being included within user interface 24. For example, the present invention contemplates that user interface 24 may be integrated with a removable storage interface provided by storage archive 22. In this example, information may be loaded into system 20 from removable storage (e.g., a smart card, a flash drive, a removable disk, etc.) that enables the user(s) to customize the implementation of and/or provide seismic data or other information to system 20. Other exemplary input devices and techniques adapted for use with system 20 as a component of user interface 24 include, but are not limited to, an RS-232 port, RF link, an IR link, and/or modem (telephone, cable or other). In short, any technique for communicating information with system 20 is contemplated by the present invention as user interface 24.

Server 26 manages the processing and storage resources provided by processing nodes 28 and storage archive 22. As such, server 26 may include one or more of a digital processor, an analog processor, a digital circuit designed to process information, an analog circuit designed to process information, a state machine, and/or other mechanisms for electronically processing information. Although server 26 is shown in FIG. 2 as a single entity, this is for illustrative purposes only. In some implementations, server 26 may include a plurality of processors (e.g., hardware units capable of processing data). These processors may be physically located within the same device, or server 26 may represent processing functionality provided by a plurality of devices operating in coordination. For example, in one embodiment, a portion of the functionality attributed to server 26 in the description below is provided by a processor (or processors) associated with storage archive 22, while another portion of the functionality attributed to server 26 is provided by a processor (or processors) that is separate and distinct (and possibly physically remote) from storage archive 22.

As is shown in FIG. 2, in one embodiment, server 26 includes a query module 30, a query results module 32, and an archive module 34. Modules 30, 32, and/or 34 may be implemented in software; hardware; firmware; some combination of software, hardware, and/or firmware; and/or otherwise implemented. It should be appreciated that although modules 30, 32, and 34 are illustrated in FIG. 2 as being co-located within a single processing unit, in implementations in which server 26 includes multiple processing units, modules 30, 32, and/or 34 may be located remotely from the other modules.

Query module 30 is configured to process queries from processing nodes 28 for access to specific beam tables. The beam table requested by one of the processing nodes 28 in a given query may or may not be included in the set of stored beam tables that are stored by storage archive 22. As such, in processing the given query, query module 30 may access storage archive 22 and search the set of stored beam tables for the requested beam table. Alternatively, query module 30 may access and analyze a list of the beam tables included in the set of stored beam tables to determine if the requested beam table is included in the set of stored beam tables. The list of beam tables is managed by server 26, and may be stored at storage archive 22 or separate from storage archive 22 by server 26. Upon performance of the given query, query module 30 provides the results of the given query to query results module 32.

Query results module 32 is configured to initiate action by system 20 that is predicated on whether the beam table requested in the given query is included in the set of stored beam tables. If the requested beam table is included in the set of stored beam tables, query results module 32 initiates access of the requested beam table by the requesting processing node 28. In one embodiment, query results module 32 initiates access of the requested beam table by transmitting to the requesting processing node 28 the storage location (e.g., a URL, a network file directory, a position within a network file, etc.) at which the requested beam table is accessible within storage archive 22. This information enables the processing node 28 to obtain the requested beam table directly from storage archive 22, or from storage archive 22 through server 26. In one embodiment, query results module 32 initiates access of the requested beam table by initiating actual transmission of the requested beam table to the requesting processing node 28. This transmission may be directly from storage archive 22 to the processing node 28, or may be through server 26.

If query module 30 determines that the requested beam table is not included within stored set of beam tables, then query results module 32 initiates computation of the requested beam table. This computation of the requested beam table is accomplished by processing nodes 28. In one embodiment, query results module 32 initiates and manages the computation of the requested beam table by processing nodes 28. In one embodiment, query results module 32 transmits a communication to the requesting processing node 28 that causes the requesting processing node 28 to perform the computation of the requested beam table. In some instances, the requesting node 28 computes the requested beam table without assistance from other ones of processing nodes 28.

Archive module 34 is configured to manage the storage of the set of stored beam tables in storage archive 22. The management of the storage of the set of stored beam tables includes the organization of the stored beam tables so that they can be located and accessed in response to requests from processing nodes 28. In one embodiment, after processing nodes 28 have computed a beam table that is not included within the set of stored beam tables, archive module 34 adds the newly computed beam table to the set of stored beam table by causing the newly computed beam table to be stored in storage archive 22 with the other beam tables included in the set of stored beam tables. This will enable the newly computed beam table to be used again by processing nodes 28, should the need arise.

In one embodiment, archive module 34 further manages the storage of the set of stored beam tables to maintain a storage size of the stored beam tables below a predetermined threshold. This threshold may be configured manually (e.g., via user interface 24) and/or configured automatically based on a capacity (and/or other parameters) of storage archive 22. In this embodiment, if the storage of a newly computed beam table with the set of stored beam tables results (or would result) in the storage size of the set of stored beam tables exceeding the predetermined threshold, archive module 34 initiates one or more actions that reduce the storage size of the set of stored beam tables below the threshold. For example, in one embodiment, archive module 34 initiates the deletion of one or more of the beam tables from the set of stored beam tables in order to reduce the storage size of the set of stored beam tables. In this embodiment, archive module 34 may specify one or more of the beam tables for deletion based on one or more of an amount of time since the beam table(s) was originally computed, an amount of time since the beam table(s) was last accessed or requested by processing nodes 28, a relative storage size of the beam table(s), and/or other factors.

Processing nodes 28 coordinate (and/or are coordinated) to provide a network of distributed processing resources to perform migration of seismic data, and the formation of an image (or images) of a seismic volume of interest (e.g., seismic volume of interest 12) from the migrated seismic data. As such, each of processing nodes 28 may implemented in one or more of hardware, software, firmware, and/or some combination of hardware, software, and/or firmware. For instance, in one embodiment, one or more of processing nodes 28 include one or more of a digital processor, an analog processor, a digital circuit designed to process information, an analog circuit designed to process information, a state machine, and/or other hardware for electronically processing information. In one embodiment, one or more of processing nodes 28 include one or more software and/or firmware modules being executed by one or more of the foregoing hardware devices.

Conventional systems configured to perform the produce outputs from seismic data that resemble the outputs produced by system 10 via processing nodes 28 typically implement a plurality of processing nodes due to the relatively large amount of processing resources required in processing seismic data. As such, system 10, which provides for several enhancements over such conventional systems, is illustrated as including a plurality of processing nodes 28. It should be appreciated that as technology advances, a system may be developed in which the processing typically accomplished with a plurality of separate processing nodes may be provided by a single node. It should further be appreciated that extending the beam table storage and management described herein for the multi-node system 10 to a similar system that implements a single processing node is included within the scope of this disclosure.

Although each processing node 28 is shown in FIG. 2 as being a single entity, this is for illustrative purposes only. In some implementations, one or more of processing nodes 28 may include a plurality of processors. These processors may be physically located within the same device, or a single processing node 28 may represent processing functionality provided by a plurality of devices operating in coordination. Further, although processing nodes 28 are illustrated in FIG. 2 as being located separately from each other, it should be appreciated that in some embodiments two or more of processing nodes 28 may be provided at a common location. In one embodiment, one or more of processing nodes 28 may include one or more software and/or firmware modules executed on a device that serves as server 26.

As is shown in FIG. 2, in one embodiment, each of processing nodes 28 includes a migration module 36 and a table module 38. Modules 36 and 38 may be implemented in software; hardware; firmware; some combination of software, hardware, and/or firmware; and/or otherwise implemented. It should be appreciated that although modules 36 and 38 are illustrated in FIG. 2 as being co-located within a single processing unit, in implementations in which individual processing nodes 28 include multiple processing units, modules 36 and 38 may be located remotely from each other.

Migration module 36 is configured to process information recorded in beam tables that correspond to table locations at the geographic surface of a seismic volume of interest to form one or more images of the seismic volume of interest. As was mentioned above, in one embodiment, the beam tables represent the decomposition of the seismic wavefronts that arrive at or near the table locations into Gaussian beams (the parameters of which are recorded in the beam tables). The table locations are distributed at or near the geographic surface of the seismic volume in a uniform distribution. This distribution (e.g., spacing, pattern, etc.) is based on one or more input parameters specified for a given migration/imaging process. These input parameters may be specified by a user (e.g., via user interface 24), specified in the seismic data and/or information related to the collection of the seismic data, and/or otherwise specified. For example, the input parameters that impact the spacing of the table locations may include one or more of an initial beam width, one or more frequencies of the seismic waves generated and/or detected, a sampling rate of the seismic data, and/or other parameters. The distribution of the table locations for a given migration may be determined by one or more of table modules 38 of processing nodes 28, server 26, and/or some combination of these components.

In one embodiment, migration module 36 may determine the "true amplitude" of the seismic waves reflected from one or more reflectors within the seismic volume of interest. In general, the amplitude of seismic waves reflected from a given surface within the seismic volume of interest may be impacted by phenomena including the parameters of the seismic waves (e.g., the amplitude of the seismic waves, etc.) that reach the given reflector, the seismic reflectivity of the given reflector, and/or other phenomena. As used herein, the "true amplitude" image of a given reflector within the seismic volume of interest refers to a metric related primarily to the seismic reflectivity of the given reflector. In some instances, in order to determine the true amplitude of the image of the given reflector, migration module 36 may analyze the beam parameters recorded in one or more beam tables according to a version of the true-amplitude inversion formula disclosed in Bleistein, "*On the imaging of reflectors in the earth,*" *Geophysics*, vol. 52, pgs. 931-942 (1987), and/or in "*Mathematics of Modeling, Migration and Inversion with Gaussian Beams,*" http://www.cwp.mines.edu/~norm/shrtcrse/gbnotes.pdf (accessed 2007), that is adapted for the analysis of seismic waves modeled as Gaussian beams (or some other basis set) rather than basic ray theory.

Table module 38 is configured to obtain beam tables for migration module 36 to enable migration module 36 to form an image or images of the seismic volume of interest. In operation, migration module 36 requests that table module 38 obtain a certain beam table. In response to such a request, table module 38 generates a query requesting the beam table that is transmitted to query module 30 of server 26. As has been set forth above, in response to this query, query module 30 determines whether the requested beam table is included in the set of stored beam tables, and query results module 32 either (i) initiates access of the requested beam table by table module 38 if the requested beam table is included in the set of stored beam tables, or (ii) initiates computation of the requested beam table by processing nodes 28 if the requested beam table is not included in the set of stored beam tables. In one embodiment, if the requested beam table is not included in the set of stored beam tables, query results module 32 initiates computation of the requested beam table by the requesting table module 38.

To compute a beam table, table module 38 computes the beam parameters of beams that arrived at the table location corresponding to the given beam table during the sampling of the seismic data. More particularly, table module 38 solves kinematic and dynamic ray tracing equations to determine the Green's functions of these beams. In one embodiment, table module 38 implements Tilted-axis, Transversely Isotropic ("TTI") parameterization in determining the Green's functions. For example, the TTI specification techniques described in Thomsen "*Weak elastic anisotropy,*" *Geophysics*, vol. 51, pgs. 1954-66 (1986); and/or Alkahalifah, et al., "*Velocity analysis for transversely isotropic media,*" *Geophysics*, vol. 60, pgs. 1550-1566 (1995) are used to specify anisotropic Earth model velocities. The anisotropic ray tracing is then performed by one or more techniques described in Cerveny, "*Seismic rays and ray intensities in inhomogeneous anisotropic media,*" *Geophysical Journal*, vol. 29, pgs. 1-13 (1972); Gajewski et al., "*Vertical seismic profile synthetics by dynamic ray tracing in laterally varying layered anisotropic structures,*" *Journal of Geophysics Res.*, vol. 95, pgs. 11301-11315, (1990); Iverson et al., "*Ray tracing for continuously rotated local coordinates belonging to a specified anisotropy,*" *Stud. Geophys. Geod.*, vol. 51, pgs. 59-88 (2007); Zhu et al., "*Prestack Gaussian-beam depth migration in anisotropic media,*" *Geophysics*, vol. 72, pgs. S133-S138 (2007); and/or Dickens "*Ray tracing in tilted transversely isotropic media: a group velocity approach,*" *SEG Extended Abstracts*, vol. 23, pgs. 973-6 (2004).

Once table module 38 determines the Green's functions, the given beam table is then created as a record of the beam parameters specified for the beams by the computed Green's functions. As such, the beam parameters recorded in the beam table are a function of a model of velocity, anisotropy, subsurfaces, and/or other Earth media properties of the seismic volume of interest (derived at least in part from the seismic data), and one or more input parameters used to determine the Green's functions. The one or more input parameters may include, for example, one or more of an initial beam direction, one or more initial beam properties, such as width, amplitude and/or characteristic frequency, a boundary condition, and/or other parameters. The input parameters are configurable (e.g., via user interface 24), and may be used for each beam table computed and/or used during a given migration/imaging process.

Figure 3:
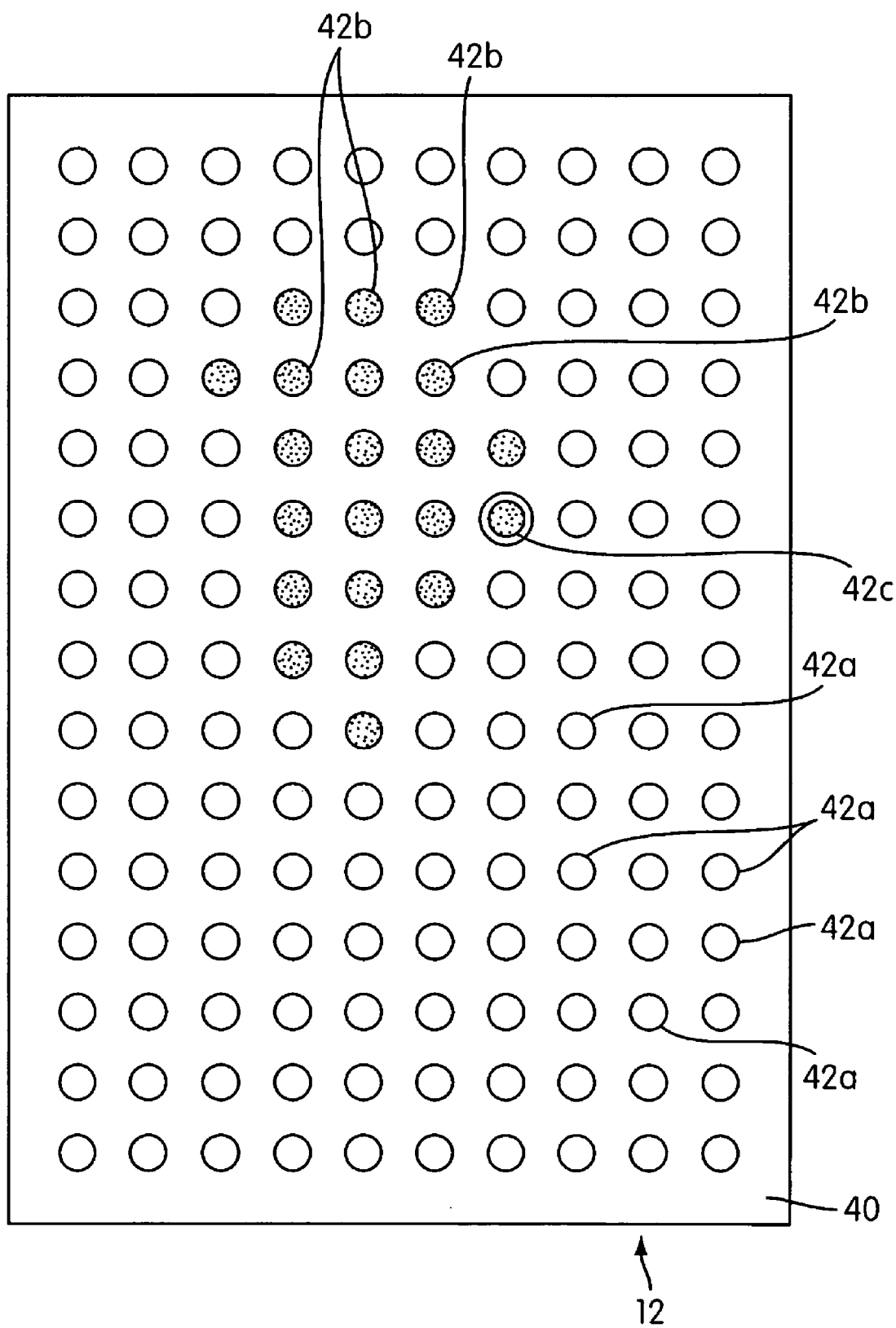
FIG. 3 illustrates a bird's eye view of a geographic surface of seismic volume of interest, according to one or more embodiments of the invention.

In order to further illustrate the operation of system 20, according to one embodiment, FIG. 3 illustrates a bird's eye view of a geographic surface 40 of seismic volume of interest 12. Accordingly, although the following description refers to FIG. 3, reference is also made to components of system 20 in FIG. 2 as the functionality of these components provide pertains to the view shown in FIG. 3. A series of table locations 42 (illustrated as table locations 42a, table locations 42b, and table location 42c) are indicated on geographic surface 40, distributed uniformly or non-uniformly along geographic surface 40. As should be apparent from the foregoing, table locations 42 shown in FIG. 3 are not the same as the locations at which detectors 16 are disposed in FIG. 1. Typically, table locations 42 are further apart than detectors 16. The seismic data recorded by a plurality detectors 16 is decomposed into a plurality of beams. These beams can be calculated from information contained in beam tables that corresponds to one of table locations 42.

In FIG. 3, a first set of table locations 42a (illustrated in outline only in FIG. 3) do not correspond to a beam table included in the set of stored beam tables stored in storage archive 22, and a second set of table locations 42b (illustrated as solid in FIG. 3) correspond to beam tables included in the set of stored beam tables stored in storage archive. If migration module 36 of a given one of processing nodes 28 requests a beam table that corresponds to a requested table location 42c, table module 38 of the given processing node 28 will generate a query for query module 30 of server 26 requesting the beam table that corresponds to requested table location 42c. If, as is the case in FIG. 3, the beam table that corresponds to requested table location 42c is included in the set of stored beam tables, then query results module 32 of server 26 will initiate access of the requested beam table by table module 38. Upon accessing the requested beam table, table module 38 will provide the requested beam table to migration module 36 so that it can be used in the migration/imaging process being executed by migration module 36.

Figure 4:
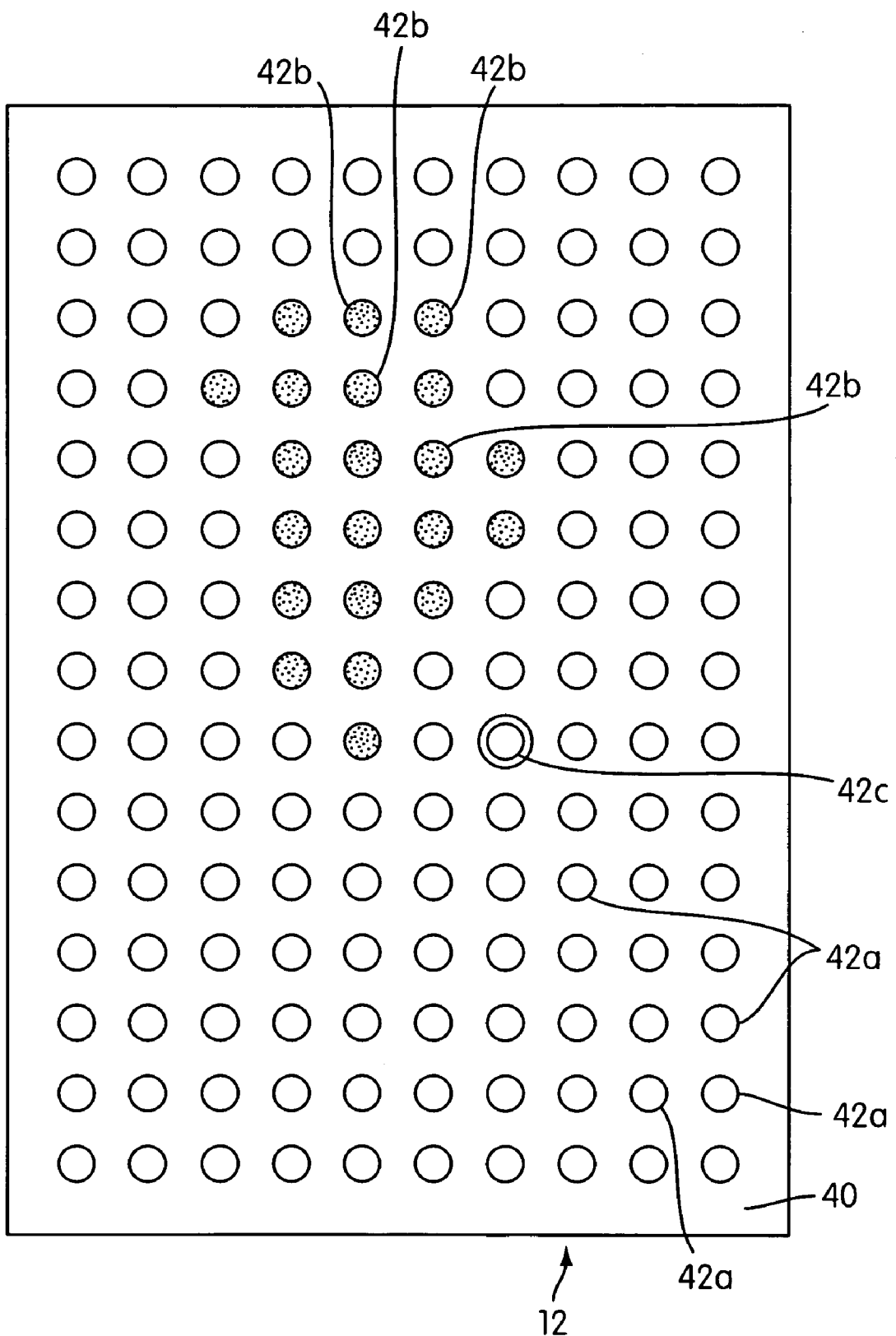
FIG. 4 illustrates a bird's eye view of a geographic surface of seismic volume of interest, according to one or more embodiments of the invention.

FIG. 4, like FIG. 3, illustrates a bird's eye view of geographic surface 40 of seismic volume of interest 12. However, in FIG. 4, requested table location 42c does not correspond to a beam table that is included in the set of stored beam tables. As such, in one embodiment, if migration module 36 requests the beam table that corresponds to requested table location 42c from table module 38 and table module 38, in turn, generates a query for the requested beam table from query module 30, query results module 32 will initiate a computation of the requested beam table by the requesting table module 38. As was discussed above, once table module 38 has computed the requested beam table, archive module 34 of server 24 coordinates the storage of the requested beam table in storage archive 22 with the set of stored beam tables.

Figure 5:
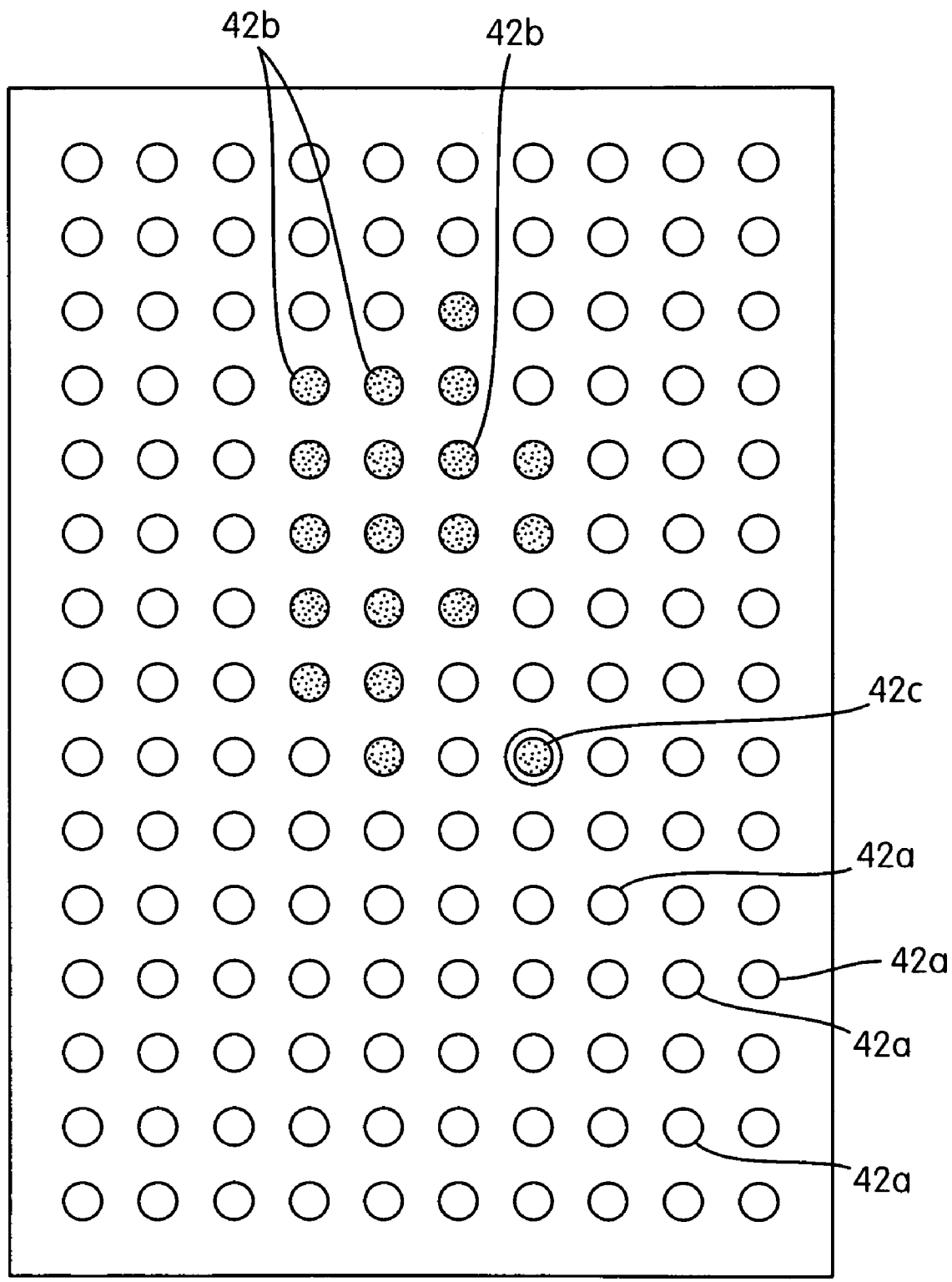
FIG. 5 illustrates a bird's eye view of a geographic surface of seismic volume of interest, according to one or more embodiments of the invention.

If the storage of the requested beam table with the set of stored beam tables causes the storage size of the set of stored beam tables to rise above the predetermined threshold, then archive module 34 may take action to maintain the storage size of the set of stored beam tables below the threshold. In one embodiment, such action includes the deletion of one or more of the beam tables previously stored with the set of stored beam tables. Such a deletion of one or more of the beam tables by archive module 34 is illustrated by FIG. 5, which illustrates the first set of table locations 42a as including table locations that correspond to newly deleted beam tables, and illustrates the requested table location 42c as being included in the second set of table locations 42b due to the computation and storage of the requested beam table.

Figure 6:
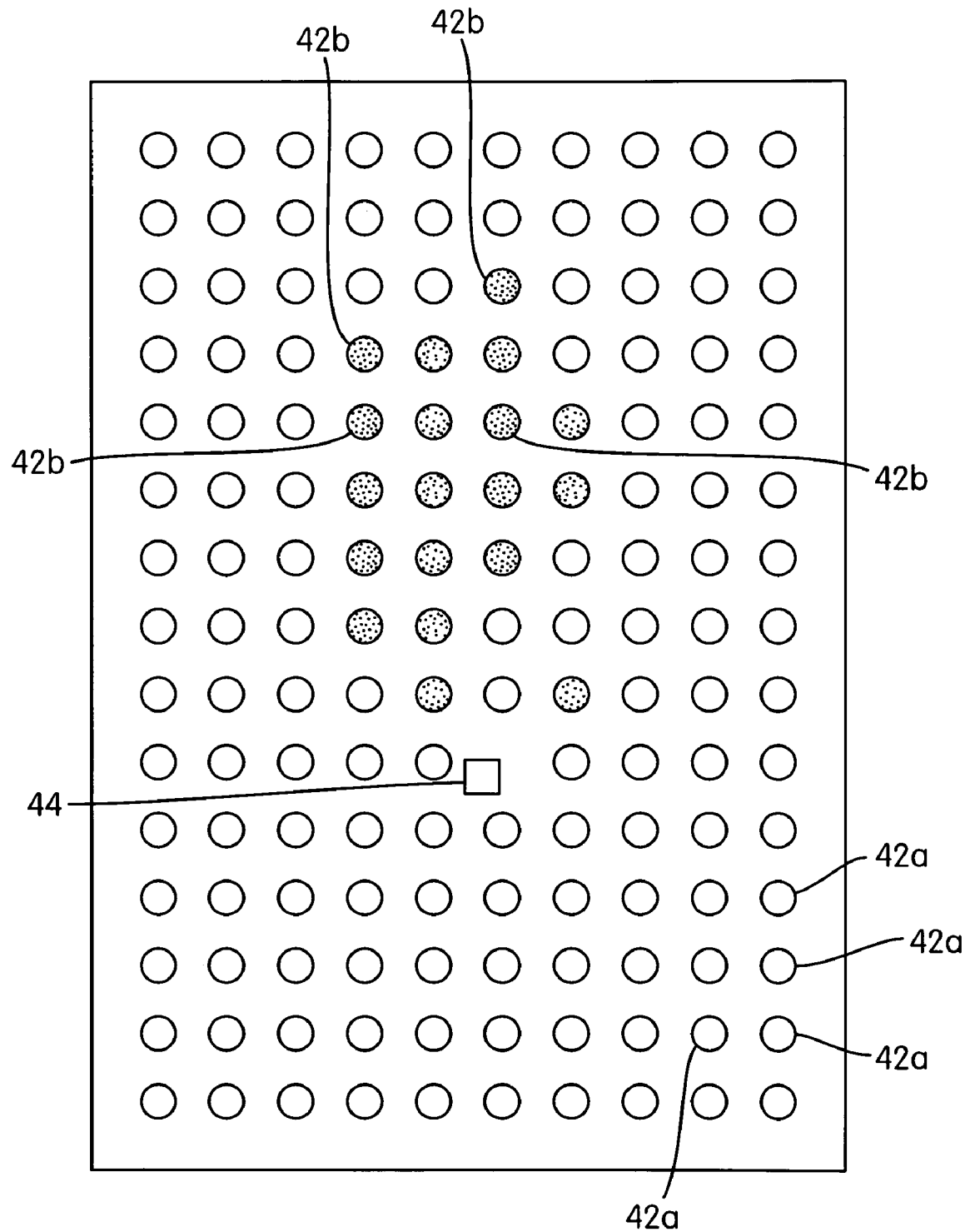
FIG. 6 illustrates a bird's eye view of a geographic surface of seismic volume of interest, according to one or more embodiments of the invention.

As was mentioned above, in one embodiment, system 20 in general, and migration modules 36 of processing nodes 28 in particular, is adapted to perform migrations and/or imaging of single shot seismic data. For such migrations, a source beam table that corresponds to the source of the seismic wavefronts propagating through seismic volume of interest 12. For example, FIG. 6 illustrates bird's eye view of geographic surface 40 of seismic volume of interest 12 shown in FIGS. 3-5, and further including a source location 44 that corresponds to the position of source 14 discussed above with respect to FIG. 1. Table modules 38 of processing nodes 28 compute the source beam table that corresponds to source location 44 such that the source beam table is a record of one or more beam parameters of a set of one more beams that form the seismic waves generated by source 14.

Figure 7:
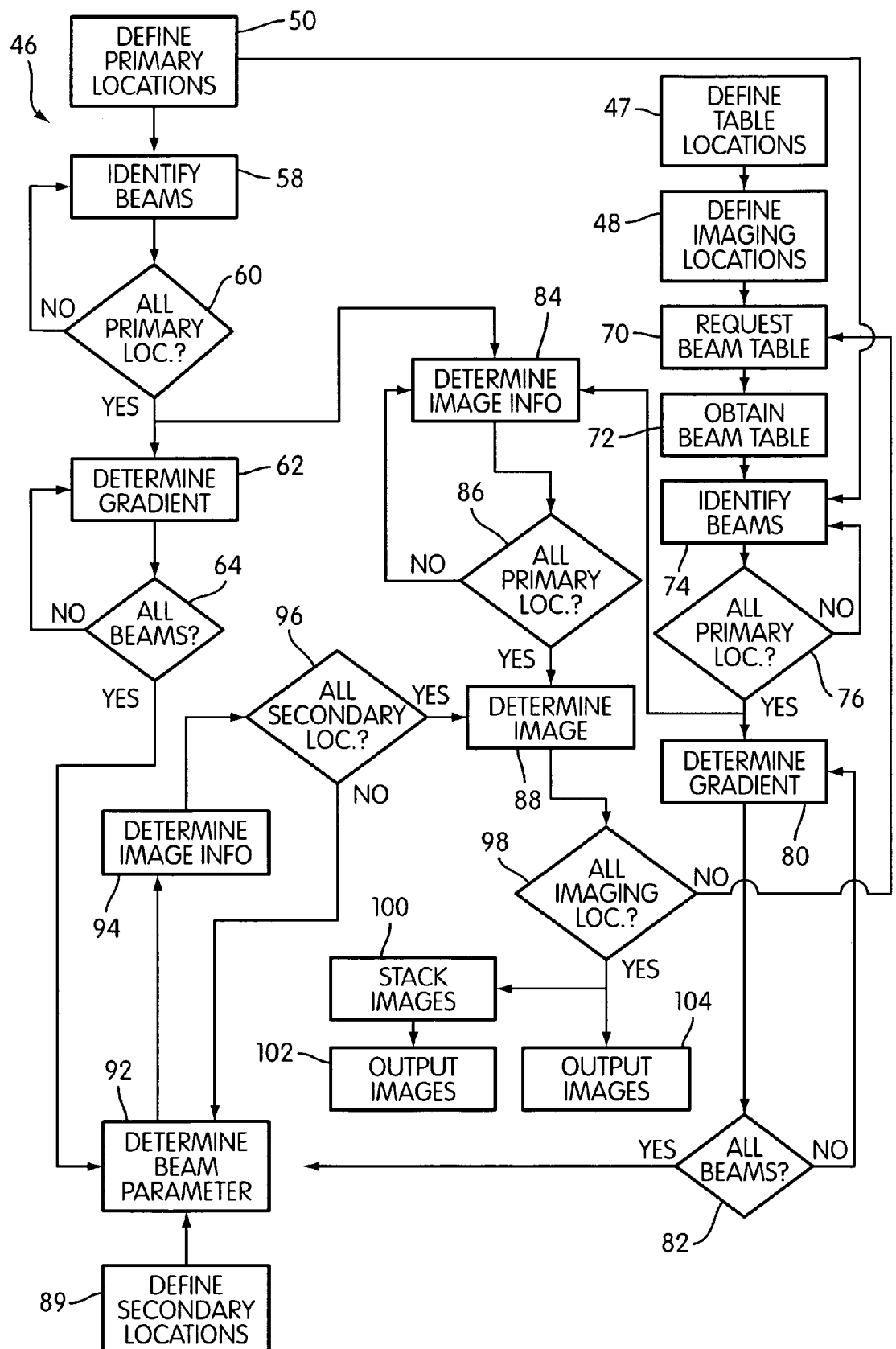
FIG. 7 illustrates a method of performing a single shot migration of seismic data to form one or more images of a seismic volume of interest from beam tables derived, at least in part, from the seismic data, in accordance with one or more embodiments of the invention.

FIG. 7 illustrates a method 46 of performing a single shot migration of seismic data to form one or more images of a seismic volume of interest from beam tables derived from a model of the seismic velocities within the seismic volume of interest (the model being, in some instances, a function, at least in part, of the seismic data). Although some of the operations of method 46 are discussed below with respect to the components of system 20 described above and illustrated in FIG. 2, it should be appreciated that this is for illustrative purposes only, and that method 46 may be implemented with alternative components and/or systems without departing from the scope of this disclosure. Further, the particular arrangement of the operations, illustrated in FIG. 7 and described hereafter is not intended to be limiting. In some implementations, various ones of the operations could be performed in an order other than the one set forth, various ones of the operations may be combined with others and/or be omitted altogether, and/or various additional operations may be added without departing from the scope of the disclosure, as should be appreciated.

In some embodiments, the single shot migration described with respect to FIG. 7 may include a "super shot" migration in which the source of the seismic waves is actually an array of seismic energy sources. For example, waves from the array of sources may be locally slant-stacked together, using the source energy propagation direction and Gaussian beam tapering, to form a single supershot. In this case each individual local slant-stack direction forms a Gaussian-beam tapered plane wave. The number and coordinates of source locations can be defined by one or more input parameters provided by the user via the user interface module.

At an operation 47, a distribution of a series of table locations at or near a geographic surface of the seismic volume of interest is defined. Each of the table locations correspond to a beam table included in the set of beam tables. In one embodiment, the parameters upon which the distribution of the series of table locations is defined have been discussed above with respect to system 20. In one embodiment, the distribution of the series of table locations is determined at operation 47 by one or both of a table module the same as, or similar to, table module 38 and/or a server the same as, or similar to, server 24, both of which are shown in FIG. 2 and described above.

At an operation 48, a series of imaging locations at or near the geographic surface of the seismic volume of interest are defined. In some implementations, these imaging locations are coincident with the series of table locations that correspond to the set of beam tables. In some implementations, the imaging locations include locations that are not coincident with the series of table locations. For example, in a "stacked" migration/imaging process, the imaging locations are defined at operation 48 to coincide with the table locations defined at operation 47, while in a "gather" migration/imaging process, the imaging locations do not coincide with the table locations. Instead, in a gather migration/imaging process, a user defines (e.g., via a user interface that is the same as or similar to user interface 24, shown in FIG. 1 and described above) a number of imaging locations. More particularly, in a gather migration/imaging process, a user specifies a number of image volumes that will be output by the process, and properties of the image volumes (e.g., offset, offset-azimuth, etc.). As should be appreciated, the number of image volumes is related to the number of imaging locations, and the properties of the image volumes specified by the user dictate the distribution of the imaging locations defined at operation 48. In one embodiment, operation 48 is performed by one or more migration modules that are the same as, or similar to, migration modules 36 shown in FIG. 2 and described above.

As is discussed further below, method 46 operates to generate an image of the seismic volume of interest for each of the imaging locations defined at operation 48. For illustrative purposes, method 46 is described below as if a single processing node were generating an image for each of the imaging locations in an iterative fashion (e.g., via operations 72, 74, 76, 80, 82, 84, 86, 88, 92, 94, and 96). However, it should be appreciated from the foregoing description of processing nodes 28, that in one embodiment, method 46 is performed in coordination by a plurality of processing nodes such that separate processing nodes determining images for a subset of the imaging locations defined at operation 48 in parallel with the other processing nodes. For example, where there are M processing nodes performing method 46 in a coordinated manner, and there are L imaging locations, each processing node may perform the requisite operations of method 46 (e.g., operations 72, 74, 76, 80, 82, 84, 86, 88, 92, 94, and 96) to form an image of the seismic volume of interest for L/M of the imaging locations.

Figure 8:
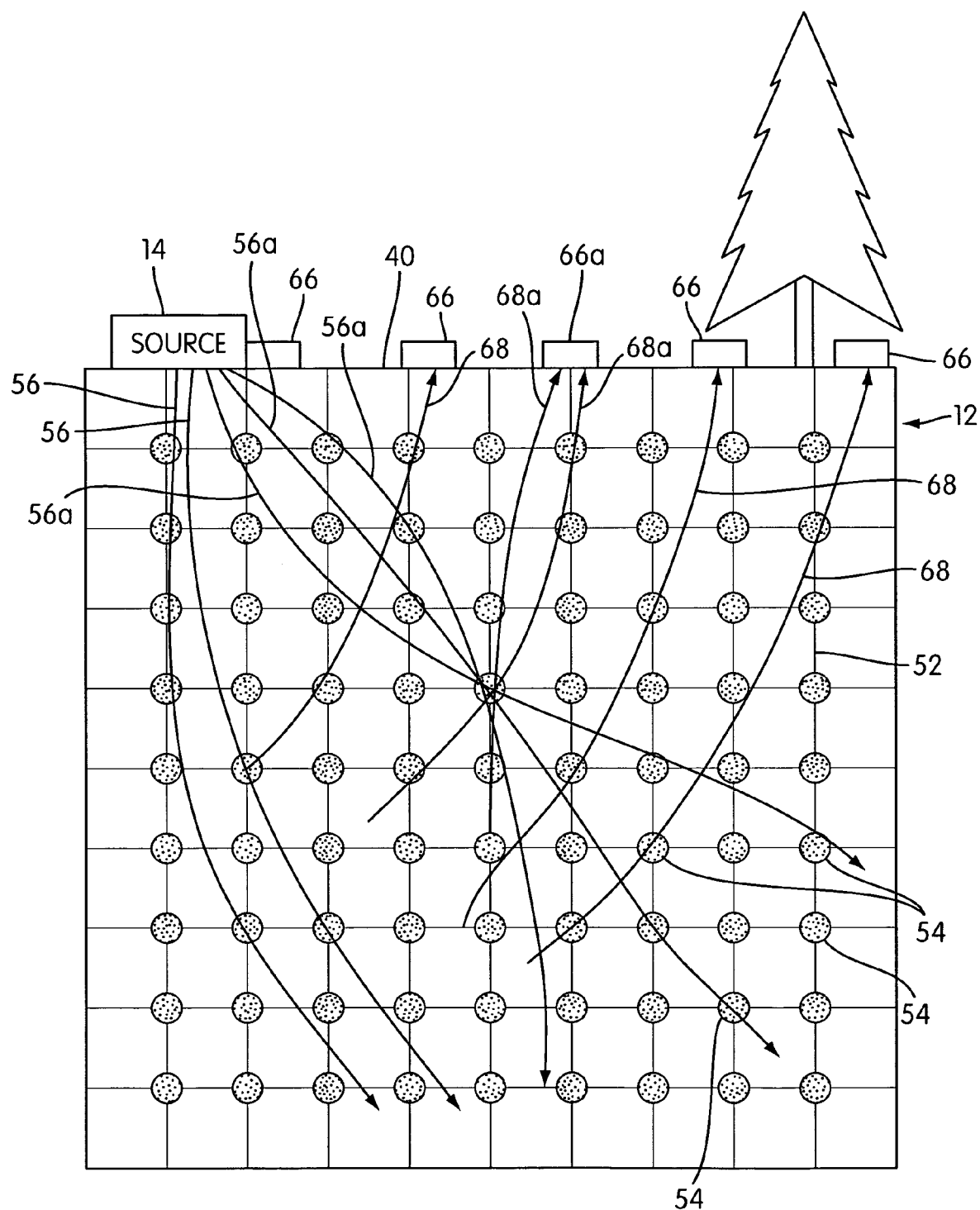
FIG. 8 illustrates an elevation view of a seismic volume of interest, according to one more embodiments of the invention.

At an operation 50, a series of primary locations within the seismic volume of interest are defined. The distribution of the primary locations is uniform throughout the seismic volume of interest. In one embodiment, the primary locations are defined to be at a series of mesh points formed at predetermined intervals by a uniform, three dimensional mesh defined within the seismic volume of interest. For example, FIG. 8 illustrates a mesh 52 defined within seismic volume of interest 12. Although in the elevation view of seismic volume of interest 12 provided in FIG. 8 mesh 52 is illustrated as being two-dimensional, it should be appreciated that this is for simplicity only, and that mesh 52 includes a third dimension perpendicular to the plane of the page. As can be seen in FIG. 8, a series of primary locations 54 are defined at mesh points that occur within mesh 52 at predetermined intervals.

FIG. 8 further illustrates source 14 disposed on geographic surface 40 of seismic volume of interest 12. When the seismic data being migrated was generated, source 14 generated wavefronts within seismic volume of interest 12 that can be decomposed as a plurality of beams 56. As has been discussed above, a source beam table that corresponds to the location at which source 14 is positioned (e.g., source location 44 in FIG. 6) when the wavefronts are generated includes one or more of the beam parameters of each of beams 56. As can be appreciated from FIG. 8, these beams may not propagate in straight paths through seismic volume of interest 12. Instead, due to differences in the composition of the stratum within seismic volume of interest 12, beams 56 may be refracted (e.g., bent) and/or reflected as they travel through seismic volume of interest 12, similar to the refraction and/or reflection of light rays as they pass through optical media with different indices of refraction. The beam parameters recorded in the source beam table will take into account the beam paths of beams 56 as they propagate through seismic volume of interest 12. Although beams 56 are shown in FIG. 8 as straight lines, this is purely for illustrative purposes. During the migration/imaging processes that are described herein, these beams are treated as Gaussian beams (although some bases set other than Gaussian beams could also be used). Some of beams 56 emanating from source 14 will pass through or near a given one of the defined primary locations 54. These beams are identified in FIG. 8 with the reference numeral 56*a*. A portion of the beams 56*a* that pass through or near the given primary location 54 will make a significant contribution to a wavefront that passes through the given primary location 54.

Referring back to FIG. 7, subsequent to the definition of the series of primary locations at operation 48, method 46 includes an operation 58, at which the beams emanating from a source of seismic waves that contribute significantly to a wavefront that passes through a given one of the primary locations are identified. In one embodiment, these beams are identified by analyzing a source beam table that corresponds to the location of the source during the generation of the seismic waves by the source. For example, the source beam table may be obtained by one or more table modules the same as or similar to table modules 38, shown in FIG. 2 and described above. Techniques for analyzing the source beam table to identify beams that make a significant contribution to a wavefront that passes through a given location within a seismic volume of interest are disclosed, for example, in *Prestack Gaussian-beam depth migration*, N. Ross Hill, *Geophysics* vol. 66, No. 4, July-August 2001, pgs. 1240-1250 ("Hill"), and *Gaussian beam migration of common-shot records*, Samuel H. Gray, *Geophysics* vol. 70, No. 4, July-August 2005, pgs. S71-S77 ("Gray"), both of which are incorporated herein in their entireties. In one embodiment, operation 58 is performed for the given primary location by one or more migration modules that are the same as, or similar to, migration modules 36 shown in FIG. 2 and described above.

At an operation 60, a determination is made as to whether operation 58 has been performed for each of the defined primary locations. In one embodiment, operation 60 is performed by one or more migration modules that are the same as, or similar to, migration modules 36 shown in FIG. 2 and described above. If it is determined at operation 60 that operation 58 has not been performed for each of the defined primary location, then method 46 returns to operation 58, and operation 58 is performed for a different primary location. If it is determined at operation 60 that operation 58 has been performed for each of the defined primary locations, then method 46 passes to an operation 62.

One of the beam parameters recorded in the source beam table includes source travel time. The source travel time of a given beam is the time it takes for the given beam to travel from the source to some location within the seismic volume of interest. As such, the source travel time of a given beam that is identified at operation 58 as making a significant contribution to one or more wavefronts that pass through a plurality of the primary locations will be different with respect to each of these primary locations (e.g., due to path length of the given beam between the source and the various primary locations included in the plurality of primary locations). At operation 62, the gradient of the source travel time of a given beam emanating from the source to a plurality of primary locations (identified at operation 58 as experiencing a wavefront to which the given beam made a significant contribution) is determined. In one embodiment, operation 62 is performed by one or more migration modules that are the same as, or similar to, migration modules 36 shown in FIG. 2 and described above.

At an operation 64, a determination is made as to whether the gradient of the source travel time has been determined for each of the beams represented in the source beam table that were identified at operation 58 as having made a significant contribution to a wavefront passing through one or more of the primary locations. If the gradient of the source travel time has not been determined for each of these beams, then method 46 returns to operation 62 and the gradient of the source travel time is determined for another beam that was identified at operation 58. If the gradient of the source travel time has been determined for each of these beams, then method 46 proceeds to an operation 92 (described below). In one embodiment, operation 64 is performed by one or more migration modules that are the same as, or similar to, migration modules 36 shown in FIG. 2 and described above.

Referring back to FIG. 8, at geographic surface 40 of seismic volume of interest 12 a series of imaging locations 66 (defined at operation 48 of method 46, shown in FIG. 7 and described above) are depicted. As has been mentioned previously, although the view shown in FIG. 8 is a two-dimensional elevation, it should be appreciated that this is for simplicity only, and, as such, the series of imaging locations 66 would be distributed according to a two-dimensional distribution across surface 40, further include additional imaging locations 66 not included in the one-dimensional array that is visible in FIG. 8.

When the seismic data now being migrated were originally generated, seismic waves propagating within the volume of interest 12 arrived at surface 40 and were recorded by a series of detectors such as, for example, detectors 16 shown in FIG. 1 and described above. It should be noted that the positions of the detectors 16 are not the same as either of the table locations defined at operation 47 of method 46, or imaging locations 66. As the seismic waves propagated within seismic volume of interest 12, some of these wavefronts were reflected within seismic volume of interest 12 and propagated up to surface 40 to be detected by the detectors, passing through primary locations 54 on their way to surface 40. Such wavefronts can be decomposed as a set of beams (e.g., Gaussian beams) 68 that pass through or near primary locations 54 and up to surface 40 to arrive at or near one of imaging locations 66. A beam table corresponding to a given one of imaging locations 66 (illustrated in FIG. 8 as location 66*a*)

will include one or more beam parameters of one or more beams that contribute to wavefronts that arrived at the given imaging location 66a while the seismic data were being obtained. Such beams will include one or more beams (illustrated in FIG. 8 as beams 68a) that contributed to wavefronts that passed through the given primary location 54 and arrived at the given imaging location 66a.

Referring back to FIG. 7, at an operation 70 of method 46, a beam table is requested for one of the imaging locations defined at operation 48, and at an operation 72, the requested beam table is obtained. In one embodiment, operation 70 is performed by one more migration modules the same as, or similar to, migration modules 36, and operation 72 is performed by one or more table modules the same as, or similar to, table modules 38, both of which are shown in FIG. 2 and described above. In some instances, the table module may obtain the beam table from a stored set of beam tables, as was discussed above. In some instances, the table module may obtain the requested beam table by computing the beam table, as was discussed above.

As has been mentioned previously, beam tables obtained by the table module at operation 72 will typically correspond to a table location defined at operation 47, and the beam table requested by the migration module at operation 70 will correspond to an imaging location defined at operation 48. As such, if the migration/imaging process being executed is a gather migration/imaging process (e.g., the imaging locations are not coincident with the table locations), operation 72 will include identifying a table location that is closest to the imaging location specified in the request of operation 70, obtaining the beam table that corresponds to the identified table location, and shifting the information recorded in the obtained beam table to account for the positional difference on the surface of the seismic volume of interest between the requested imaging location and the identified table location.

At an operation 74, the beam table obtained at operation 72 is used to identify beams that contributed significantly to wavefronts that passed through a given one of the primary locations and the imaging location that corresponds to the obtained beam table (e.g., beams 68a in FIG. 8, passing through or near the given primary location 54 and the given imaging location 66a). In some instances, the obtained beam table is analyzed using substantially the same technique as was implemented to analyze the source beam table at operation 58. In one embodiment, operation 74 is performed by one or more migration modules that are the same as, or similar to, migration modules 36 shown in FIG. 2 and described above.

At an operation 76, a determination is made as to whether operation 74 has been performed, for the beam table obtained at operation 72, with respect to each of the primary locations. In one embodiment, operation 76 is performed by one or more migration modules that are the same as, or similar to, migration modules 36 shown in FIG. 2 and described above. If the determination is made at operation 76 that operation 74 has not been performed, for the beam table obtained at operation 72, with respect to each of the primary locations, then method 46 returns to operation 74, and operation 74 is performed, for the beam table obtained at operation 72, with respect to a different primary location. If the determination is made at operation 76 that operation 74 has been performed, for the beam table obtained at operation 72, with respect to each of the primary locations, then method 46 proceeds to an operation 80.

Since, in one embodiment, the beam parameters included in the beam tables that correspond to the imaging locations, the beam tables obtained at operation 72 include a detector travel time (similar to the source travel time discussed above). The detector travel time of a given beam between an imaging location and a primary location is the time that it takes for the beam to travel from the primary location to the imaging location within the seismic volume of interest. As such, the detector travel time of a given beam that arrives at or near a given imaging location will be different for different ones of the primary locations that the beam passes through or near (e.g., due to path length for the given beam between the given imaging location and the various primary locations). At operation 80, the gradient of the detector travel time of a given beam that contributes significantly to a wavefront that passes through the primary locations to the surface of the seismic volume of interest (e.g., as identified in operation 74) is determined. The gradient of the detector travel time is determined based, at least in part, on the detector travel times of the beams derived from the beam table requested and obtained at operations 70 and 72. In one embodiment, operation 80 is performed by one or more migration modules that are the same as, or similar to, migration modules 36 shown in FIG. 2 and described above.

At an operation 82 a determination is made as to whether the gradient of the detector travel time has been determined for each of the beams identified at operation 74 has having made a significant contribution to a wavefront passing through one or more of the primary locations. If the gradient of the detector travel time has not been determined for each of these beams, then method 46 returns to operation 80 and the gradient of the detector travel time is determined for another beam that was identified at operation 74. If the determination is made at operation 82 that the gradient of the detector travel time has been determined for each of these beams, then method 46 proceeds to operation 92. In one embodiment, operation 82 is performed by one or more migration modules that are the same as, or similar to, migration modules 36 shown in FIG. 2 and described above.

At an operation 84, image information is determined for a given primary location. In one embodiment, operation 84 implements beam parameters for the beams identified at operations 58 and 74 as contributing to wavefronts that pass through the given primary location to determine the image information. In one embodiment, operation 84 is performed by one or more migration modules that are the same as, or similar to, migration modules 36 shown in FIG. 2 and described above.

Figure 9:
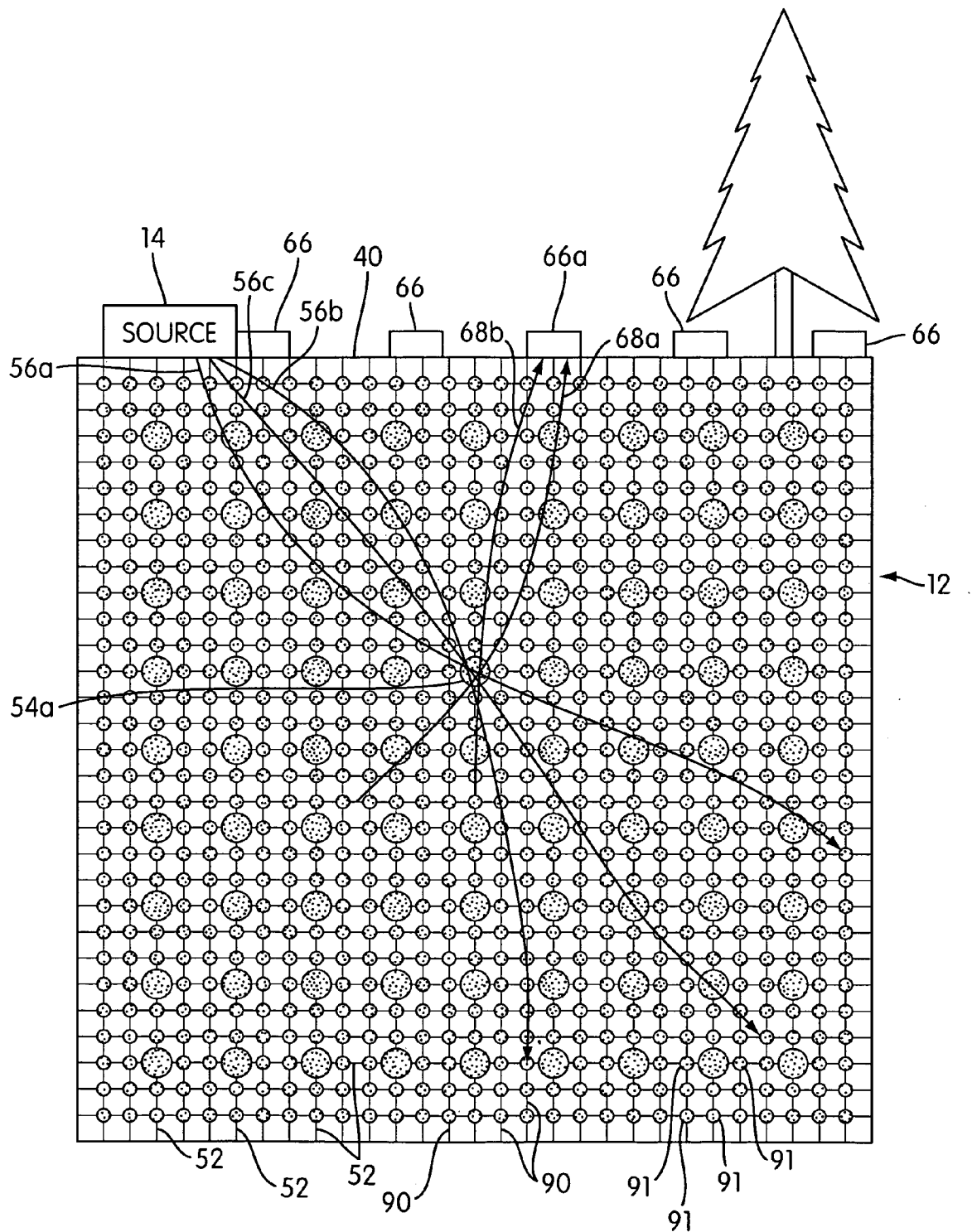
FIG. 9 illustrates an elevation view of a seismic volume of interest, according to one more embodiments of the invention.

By way of illustration of the determination made at operation 84, FIG. 9 provides an elevation view of seismic volume of interest 12 similar to the one shown in FIG. 8. More particularly, FIG. 9 illustrates a given primary location 54a, a set of beams 56 (illustrated as beams 56a, 56b, and 56c) that contributed significantly to one or more wavefronts that emanated from source 14 and passed through the given primary location 54a, and a set of beams 68 (illustrated as beams 68a and 68b) that contributed to one or more wavefronts that passed through the given primary location 54a and continued up to surface 40 of seismic volume of interest 12 at or near a given imaging location 66a. Each possible pairing between one of beams 56 and beams 68 is referred to as a single "arrival pair" for the given primary location 54a (e.g., beams 56a and 68a, beams 56a and 68b, beams 56b and 68a, etc.). As should be appreciated, the number of arrival pairs for the given primary location 54a is the number of beams 56 that contributed significantly to one or more wavefronts that emanated from source 14 and passed through the given primary location 54a multiplied by the number of beams 68 that contributed to one or more wavefronts that passed through the given primary location 54a and continued up to surface 40 of seismic volume of interest 12 at given imaging location 66a

(e.g., 2*3=6). Each arrival pair of the given primary location 54a has a total travel time that is determined by adding the source travel time of the beam 56 included in the arrival pair to the detector travel time of the beam 68 included in the arrival pair. From the total travel times of the arrival pairs, and/or one or more other beam parameters of beams 56 and 68 image information is determined for given primary location 54a. One technique that can be implemented (e.g., at operation 88 of method 46 in FIG. 7) to determine the image information for given primary location 54a from the beam parameters of beams 56, 68, and/or the arrival pairs is described in Hill, "*Prestack Gaussian-beam depth migration,*" *Geophysics*, vol. 66, No. 4, pgs. 1240-50 (July-August 2001); and Gray, "*Gaussian beam migration of common-shot records,*" *Geophysics*, bol. 70, No. 4, pgs. S71-7 (July-August 2005).

Returning to FIG. 7, at an operation 86, a determination is made as to whether image information has been determined for each of the primary locations. If image information has not been determined for each of the primary locations, then method 46 returns to operation 84, and image information is determined for a different one of the primary locations. If image information has been determined for each of the primary locations, the method 46 implements the determined image information in an operation 88, which is discussed further below. In one embodiment, operation 86 is performed by one or more migration modules that are the same as, or similar to, migration modules 36 shown in FIG. 2 and described above.

At an operation 89, a series of secondary locations within the seismic volume of interest are defined. As was the case with the primary locations defined at operation 50, in one embodiment, the secondary locations are defined to be disposed in the seismic volume of interest at a series of mesh points formed at predetermined intervals by a uniform, three dimensional mesh. However, the mesh that defines the positions of the secondary locations is finer than the mesh that defines the positions of the primary locations such that the secondary locations are positioned intermittently between the primary locations. By way of illustration, FIG. 9 shows a plurality of secondary locations 91 are disposed at a mesh 90 that is finer than mesh 52 defining the positions of primary locations 54.

Referring back to FIG. 7, at operation 92, the travel times and their gradients determined at operations 62 and 80 for source travel times and detector travel times, respectively, are implemented to determine one or more beam parameters of beams that contributed to wavefronts that emanated from the seismic wave source, passed through a given one of the secondary points defined at operation 89, and arrived at or near the imaging location that corresponds to the beam table obtained at operation 72. These beam parameters may include, for example, a source incident angle, a source travel time, a detector travel time, a detector incident angle, and/or other beam parameters. By using travel times and their gradients determined for the source and detectors, operation 92 can determine the required beam parameters without accessing beam parameter values for one or more primary locations that are nearby to the given secondary location, and interpolating these values. This will enhance the efficiency of method 46 by reducing the amount of storage and/or processing resources required to determined the beam parameters for the given secondary location. Further, the implementations of the travel time gradients to determine the beam parameters tends to alleviate artifacts in images produced by method 46 introduced by determining beam parameters at secondary locations through conventional interpolation techniques. In one embodiment, operation 92 is performed by one or more migration modules that are the same as, or similar to, migration modules 36 shown in FIG. 2 and described above.

At an operation 94, image information is determined for the given secondary location. More specifically, the beam parameters determined at operation 92 for the beams that contributed to one or more wavefronts that passed through the given secondary location and arrived at the imaging location that corresponds to the beam table obtained at operation 72 are used to determine the image information for the given secondary location. In one embodiment, the image information is determined from the beam parameters determined at operation 92 in substantially the same manner as information is determined for the primary locations at operation 88 (as discussed above). In one embodiment, operation 94 is performed by one or more migration modules that are the same as, or similar to, migration modules 36 shown in FIG. 2 and described above.

At an operation 96 a determination is made as to whether image information has been determined for each of the secondary locations defined at operation 84. If image information has not been determined for each of the secondary locations, method 46 returns to operation 92 and operations 92 and 94 are performed with respect to a different secondary location. If image information has been determined for each of the secondary locations, then method 46 proceeds to the aforementioned operation 88. In one embodiment, operation 96 is performed by one or more migration modules that are the same as, or similar to, migration modules 36 shown in FIG. 2 and described above.

At operation 88 an image of the seismic volume of interest is formed from the image information determined at operations 84 and 94. This image may be considered a discrete output image volume, or may be stacked with other images of the seismic volume of interest. In one embodiment, operation 88 is performed by one or more migration modules that are the same as, or similar to migration modules 36, shown in FIG. 2 and described above.

At an operation 98 a determination is made as to whether an image has been formed at operation 88 for each of the imaging locations defined at operation 48. Where method 46 is being performed by a plurality of processing nodes working in parallel, this determination may include one or both of determining whether an image has been formed at operation 88 for the imaging locations previously assigned to a given processing node, and/or determining whether an image has been formed at operation 88 for each and every one of the imaging locations defined at operation 48. If the determination is made that an image has not been formed at operation 88 for each of the imaging locations, then method 46 returns to operation 70, a beam table corresponding to a different imaging location is requested, and operations 72, 74, 76, 80, 82, 84, 86, 88, 92, 94, and 96 are performed for the newly requested beam table. If the determination is made at operation 98 that an image has been formed at operation 88 for each of the imaging locations, then method 46 proceeds. If there is additional data to be migrated (e.g., from another shot of the seismic volume of interest), then that migration is performed (e.g., according to method 46). If no other data remains to be migrated, then method 46 proceeds to outputting of the images formed at operation 88 (for this and the other shots).

If the migration/imaging process is a stack migration/imaging process, and method 46 proceeds from operation 98 (e.g., because there is no further data to migrate), at an operation 100, the images formed at operation 88 are stacked. Once the images are stacked into a single output image, the stacked image is output at an operation 102.

If the migration/imaging process is a gather migration/imaging process, method 46 proceeds from operation 98 to an operation 104, at which the imaged formed at operation 88 are individually combined with corresponding separate gather images from other shots that have been migrated (e.g., according to method 46), and are output as separate gather image volumes.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to process seismic data, the system comprising:
    a plurality of processing nodes configured to process seismic data for migration, wherein each processing node comprises:
        a migration module configured to determine an image of the seismic volume beneath the geographic surface, wherein the determination is based at least in part on one or more beam tables, and wherein a beam table corresponds to an imaging location on a geographic surface of the seismic volume of interest and is a record of one or more beam parameters of one or more beams that form seismic wavefronts arriving at the imaging location; and
        a table module configured to obtain beam tables for the migration module; and
    a server that is operatively linked to each of the plurality of processing nodes to enable communication between the server and the processing nodes, and wherein the server comprises:
        a query module configured to receive a request from the table module of one of the processing nodes for a beam table corresponding to a table location on the geographic surface of the seismic volume of interest, and to determine whether the requested beam table is included within a set of stored beam tables, wherein the table location on the geographic surface is determined by the requesting table module based on the imaging location identified in a request for a beam table from the migration module associated with the requesting table module; and
        a query results module configured to initiate access of the requested beam table by the requesting table module if the requested beam table is included in the set of stored beam tables.

2. The system of claim 1, wherein the query results module is further configured to initiate computation of the requested beam table by the table modules of one or more of the processing nodes if the requested beam table is not included in the set of stored beam tables.

3. The system of claim 2, wherein the table modules employ tilted-axis, transversely isotropic Earth model parameterization and an anisotropic raytrace method in determining the requested beam table.

4. The system of claim 2, wherein the table modules of the one or more of the processing nodes that computes the requested beam table is the table module of the processing node that includes the requesting migration module.

5. The system of claim 2, further comprising a storage archive that stores the set of stored beam tables, wherein the requested beam table is stored in the storage archive after being computed by the table modules of one or more of the processing nodes.

6. The system of claim 5, wherein the server further comprises an archive module configured to maintain the storage size of the set of stored beam tables below a predetermined threshold.

7. The system of claim 6, wherein the archive module maintains the storage size of the set of stored beam tables below the predetermined threshold by deleting one or more previously stored beam tables from the archive.

8. The system of claim 1, wherein the migration module is further configured to determine a true amplitude of the seismic waves reflected from one or more reflectors within the seismic volume.

9. The system of claim 1, wherein the one or more beam parameters comprise one or more of a travel time, an amplitude, a phase, or an angle of incidence.

* * * * *